Patented Jan. 4, 1938

2,104,564

UNITED STATES PATENT OFFICE 2,104,564

PROCESS FOR THE SIMULTANEOUS PRODUCTION OF IRON AND PORTLAND CEMENT IN A BLAST FURNACE

Wilhelm Lennings, Oberhausen, and Ernst Karwat, Grosshesselohe, near Munich, Germany, assignors, by mesne assignments, to Union Carbide and Carbon Corporation, a corporation of New York No Drawing. Application March 27, 1935, Serial No. 13,226. In Germany March 28, 1934

8 Claims. (Cl. 75—30)

It has been proposed to smelt in a blast furnace, together with the iron, a slag having the composition of Portland cement. For this purpose sufficient lime is admixed with the blast furnace charge so that the slag will have the composition of Portland cement and the furnace blast is enriched with oxygen to such a degree that the increased smelting temperature of the lime-enriched slags will be attained in the hearth. In carrying out this process in practice, however, it has been found that although it is possible to operate for short periods according to these proposals, continuous operation is made impossible because of severe hanging disturbances in the shaft and sticking of the slag in the hearth. An object of the present invention is the elimination of these difficulties.

The production in a blast furnace of a slag having the composition of Portland cement was heretofore regarded as being particularly advantageous in those instances where lime-containing ores which were poor in iron were being smelted. Extensive experiments, however, showed that the kind of ores heretofore considered as favorable were actually the ones which caused particular difficulties in the production of a Portland cement slag. Nor is it sufficient merely to enrich with lime those ore mixtures which it is customary to use in the production of normal slag and normal pig iron, because it is in such instances, particularly, that appreciable hanging disturbances occur. The experiments have shown, on the other hand, that the hanging disturbances in the furnace can only be prevented by keeping the weight of slag produced smaller than the produced weight of pig iron.

This result could in no way be foreseen. A blast furnace operated with an oxygen-enriched blast can handle without the slightest difficulty, in general, per ton of pig iron, much more slag than pig iron. Furthermore, when enriching the customary ore mixtures with lime in accordance with known methods one obtains in by far the most cases a weight of slag which is greater than the weight of iron. In the production of pig iron together with a slag having the composition of Portland cement in accordance with present invention, however, it is necessary to eliminate from the charge those components which are rich in silica and replace them with components which are poor in silica and which contain preferably at least six times as much iron as silica.

According to the proposals heretofore made for the production of a slag having the composition of Portland cement in a blast furnace, the blast, furthermore, is enriched with oxygen only to such a degree that the cement slag leaves the furnace as a thin liquid. With a blast temperature of 750° C. it is sufficient for this purpose to remove from the furnace blast approximately 16% of the nitrogen, which results in a blast containing about 24% oxygen. The slag then leaves the furnace as a thin liquid, it is practically free from reducing impurities such as calcium carbide, and directly after the fine-grinding has the properties of Portland cement.

In carrying out this method of operation in practice, however, it has been found, even with small volumes of slag, that in many cases uninterrupted operation could proceed for only a short period, while continuous operation was generally halted through hanging disturbances. These hanging disturbances cannot be eliminated through the methods commonly employed in blast furnace operation. Neither a classification of the charge according to the size of its pieces, nor an agglomeration or briquetting of the lime-ore charge, nor the introduction of cooling gas above the hearth, suffice to prevent the hanging disturbances. The utilization of a cold blast which in normal blast furnace operation will again start up a hanging furnace is of no value in this case, inasmuch as this is accompanied by a cooling of the hearth which permits the slag to freeze in the pit of the hearth. If one attempts to prevent the difficulties by increasing the amount of coke used, it will be found that the required volume of coke is so high that the smelting of cement slag becomes absolutely uneconomical.

On the other hand, it has been found as a result of extensive experiments that the hanging disturbances in the shaft can be eliminated if one removes from the furnace blast at least twice as much nitrogen as is necessary when considering only the heat requirement of the hearth for smelting a thin-liquid cement slag in the heretofore proposed manner. Therefore, with a blast temperature of 750°, for example, not merely 16%, but rather approximately 40% of the nitrogen must be removed from the furnace blast (that is, the blast must contain over 31% oxygen) in order to assure the smooth descent of the charge through the shaft into the smelting zone.

It could in no way be anticipated that this mode of operation could be employed as a means for eliminating hanging disturbances, inasmuch as from the standpoint of the heat economy of the blast furnace in the hearth and shaft, an oxygen-enrichment of the furnace blast in many respects would result in exactly opposite effects from those resulting from the means otherwise employed for eliminating hanging disturbances, namely, blowing with colder blast. In addition, the costs of enriching the blast with oxygen are doubled, inasmuch as they correspond to the volume of nitrogen separated.

If the hanging disturbances in the shaft are eliminated in this manner through the utilization of a particularly high oxygen concentration, there will still be frequent occasions when the slag freezes in the pit of the blast furnace hearth and the operation must thus be interrupted for a longer period. It was found that watching the calcium carbide content of the slag provided a sure method for preventing such interruptions in sufficient time. The normal calcium carbide content in the slag which, in accordance with the experimental results, is advisable for uninterrupted operation is approximately 2%. The minimum calcium carbide content which may occur temporarily is, in general, approximately 1%. Lower carbide contents are an indication that there is a deficiency in the heat volumes of the highest temperature in the blast furnace hearth. In cases where this occurs, the heat volume available at the highest temperature must be increased, the quickest remedy being an increase of the oxygen concentration in the furnace blast or, what is probably more desirable in continuous operation, increasing the amount of coke to such a degree that the slag finally again attains its normal calcium carbide content. In contrast to the heretofore proposed method of operation, therefore, the process in the blast furnace is not directed towards obtaining the purest possible slag having the composition of cement, but rather towards first obtaining a carbide-containing intermediate product, from which the carbide is removed in the known manner following the tapping. This roundabout way is employed for the purpose of preventing difficulties due to the sticking of the slag in the hearth of the furnace.

Inasmuch as the same conditions which lead to the formation of carbide in the slag in a blast furnace also lead to an increased reduction of the silica, that is, to a higher silicon content in the pig iron, one also has a means available in the observation of the silicon content of the pig iron for preventing in sufficient time interruptions in the operation of the furnace due to the freezing of the slag in the hearth. According to the experimental results, the lower limits of the silicon content is approximately 0.7% Si in the pig iron; when lower silicon contents occur, the same remedies must be applied as in the cases where the calcium carbide content of the slags is too low.

The process is therefore applicable only for the production of those types of ferrous products which can be produced at relatively high operating temperatures, such as ferromanganese, and pig iron containing more than about 0.7% silicon.

We claim:

1. Process for producing, in a blast furnace, pig iron together with a slag having the composition of Portland cement, wherein the charge is enriched with lime and the furnace blast is enriched with oxygen, characterized in that the weight of slag is kept smaller than the produced weight of pig iron, whereby free flow of the charge through the furnace is promoted.

2. Process for producing, in a blast furnace, pig iron together with a slag having the composition of Portland cement, wherein the charge is enriched with lime and the furnace blast is enriched with oxygen, characterized in that the weight of slag is kept smaller than the produced weight of pig iron by using iron ores containing at least six times as much iron as silica, whereby free flow of the charge through the furnace is promoted.

3. Process for producing, in a blast furnace, pig iron together with a slag having the composition of Portland cement, wherein the charge is enriched with lime and the furnace blast is enriched with oxygen, characterized in that the weight of slag is kept smaller than the produced weight of pig iron by using iron ores containing at least six times as much iron as silica, and that the iron produced contains at least about 0.7% silicon.

4. Process for producing, in a blast furnace, pig iron together with a slag having the composition of Portland cement, wherein the charge is enriched with lime and the furnace blast is enriched with oxygen, characterized in that the weight of slag is kept smaller than the produced weight of pig iron, and the volume of coke and the temperature and oxygen concentration of the blast are so selected that the slag, upon tapping, contains at least 1% calcium carbide, whereby free flow of the charge through the furnace is promoted.

5. Process for producing, in a blast furnace, pig iron together with a slag having the composition of Portland cement, wherein the charge is enriched with lime and the furnace blast is enriched with oxygen, characterized in that the weight of slag is kept smaller than the produced weight of pig iron, and the volume of coke and the temperature and oxygen concentration of the blast are so selected that pig iron containing at least about 0.7% silicon is produced together with the Portland cement slag, whereby free flow of the charge through the furnace is promoted.

6. Process for producing, in a blast furnace, pig iron together with a slag having the composition of Portland cement, wherein the charge is enriched with lime and the furnace blast is enriched with oxygen, characterized in that the weight of slag is kept smaller than the produced weight of pig iron and the oxygen concentration of the blast is kept above 30%, whereby free flow of the charge through the furnace is promoted.

7. Process for producing, in a blast furnace, pig iron together with a slag having the composition of Portland cement, wherein the charge is enriched with lime and the furnace blast is enriched with oxygen, characterized in that the oxygen concentration of the blast is kept above 30%, and the weight of slag is kept smaller than the produced weight of pig iron by using iron ores containing at least six times as much iron as silica, whereby free flow of the charge through the furnace is promoted.

8. Process for producing, in a blast furnace, pig iron together with a slag having the composition of Portland cement, wherein the charge is enriched with lime and the furnace blast is enriched with oxygen, characterized in that the oxygen concentration of the blast is kept above 30%, and the weight of slag is kept smaller than the produced weight of pig iron by using iron ores containing at least six times as much iron as silica, and the volume of coke in the charge and the temperature and oxygen concentration of the blast are so regulated that the slag, upon tapping, contains at least 1% calcium carbide, whereby free flow of the charge through the furnace is promoted.

WILHELM LENNINGS.
ERNST KARWAT.